United States Patent [19]

Miura

[11] 4,440,487
[45] Apr. 3, 1984

[54] COPYING APPARATUS
[75] Inventor: Makoto Miura, Hino, Japan
[73] Assignee: Canon Kabushiki Kaisha, Tokyo, Japan
[21] Appl. No.: 377,555
[22] Filed: May 12, 1982
[30] Foreign Application Priority Data May 22, 1981 [JP] Japan .................................. 56-77599
May 22, 1981 [JP] Japan .................................. 56-77600
May 22, 1981 [JP] Japan .................................. 56-77601

[51] Int. Cl.³ .......................................... G03G 15/00
[52] U.S. Cl. ................................ 355/14 R; 355/3 SH
[58] Field of Search ............. 355/14 R, 14 SH, 3 SH, 355/11, 50, 51, 8, 65, 66; 271/265, 275

[56] References Cited
U.S. PATENT DOCUMENTS 4,302,098 11/1981 Kan et al. .......................... 355/3 SH
4,338,020 7/1982 Yukawa et al. ................. 355/14 SH
4,341,460 7/1982 Kohyama ....................... 355/14 SH Primary Examiner—Richard L. Moses
Attorney, Agent, or Firm—Fitzpatrick, Cella, Harper & Scinto

[57] ABSTRACT

A copying apparatus has an original size sensing switch for sensing the size of an original, a memory for storing cassette size information, a comparator for comparing the original size information output by the original size sensing switch with the cassette size information read out from the memory, and a microcomputer for controlling the copying operation of the apparatus in accordance with a comparison output from the comparator. The copying operation may be performed in accordance with the size of the original fed to the exposure position. The automatic copying operation in accordance with the sensed original size may be released as needed for manual control.

14 Claims, 20 Drawing Figures

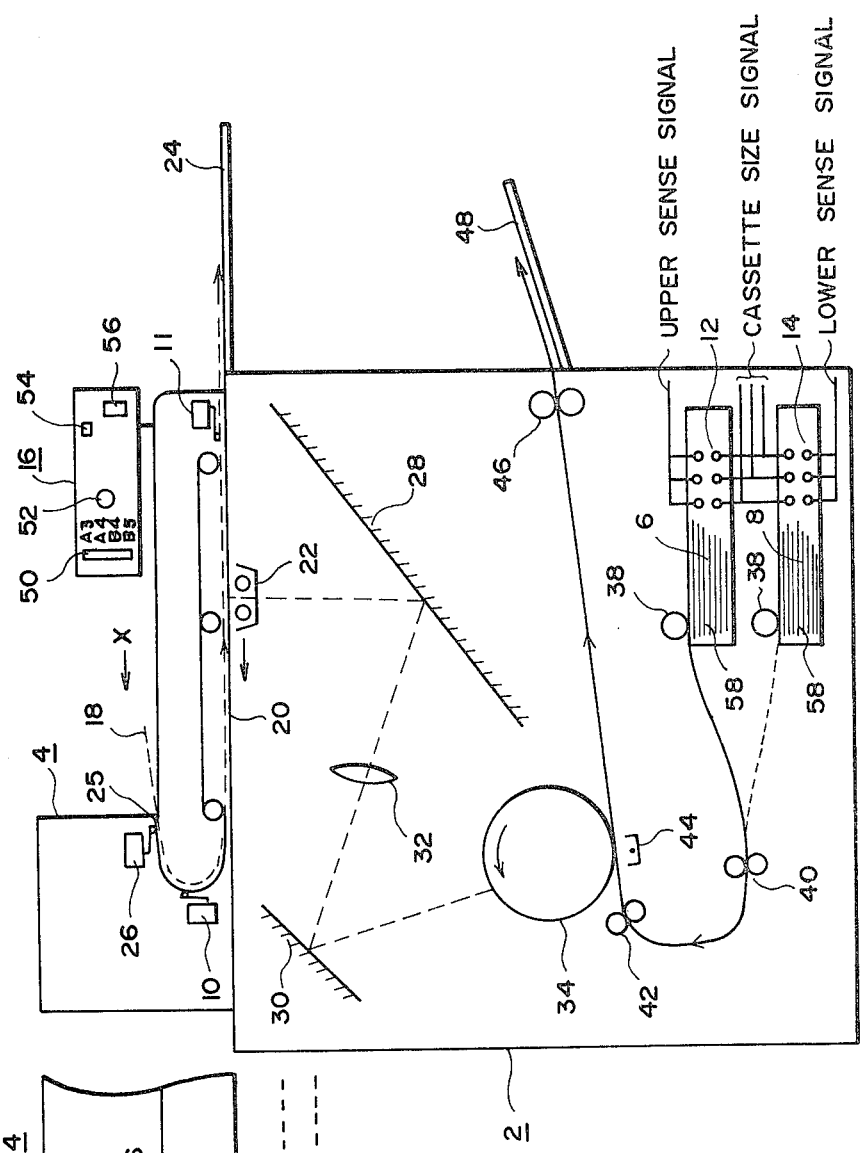
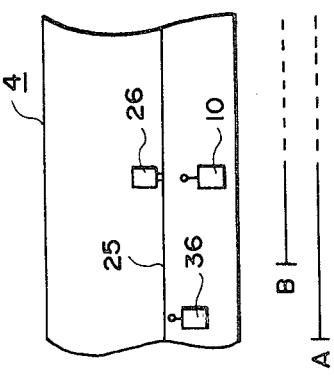

|   | A | B | C | D |
|---|---|---|---|---|
| $P_0$ | 1 | 0 | 0 | 1 |
| $P_1$ | 0 | 1 | 0 | 1 |
| $P_2$ | 0 | 0 | 1 | 0 |
| SIZE | $B_5$ | $B_4$ | $A_4$ | $A_3$ |
FIG. 5
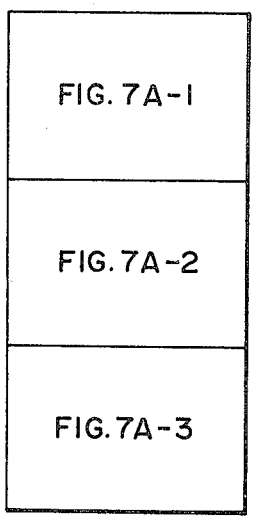
FIG. 7A
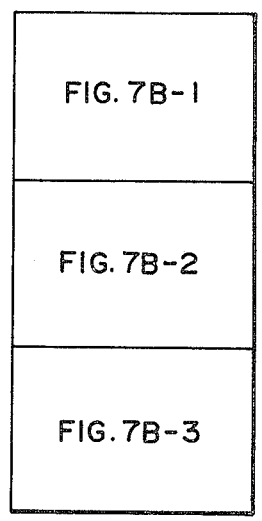
FIG. 7B
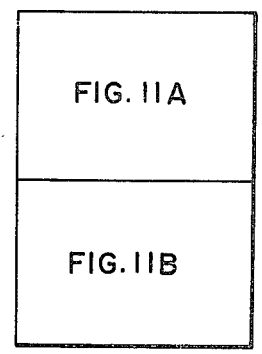
FIG. 11

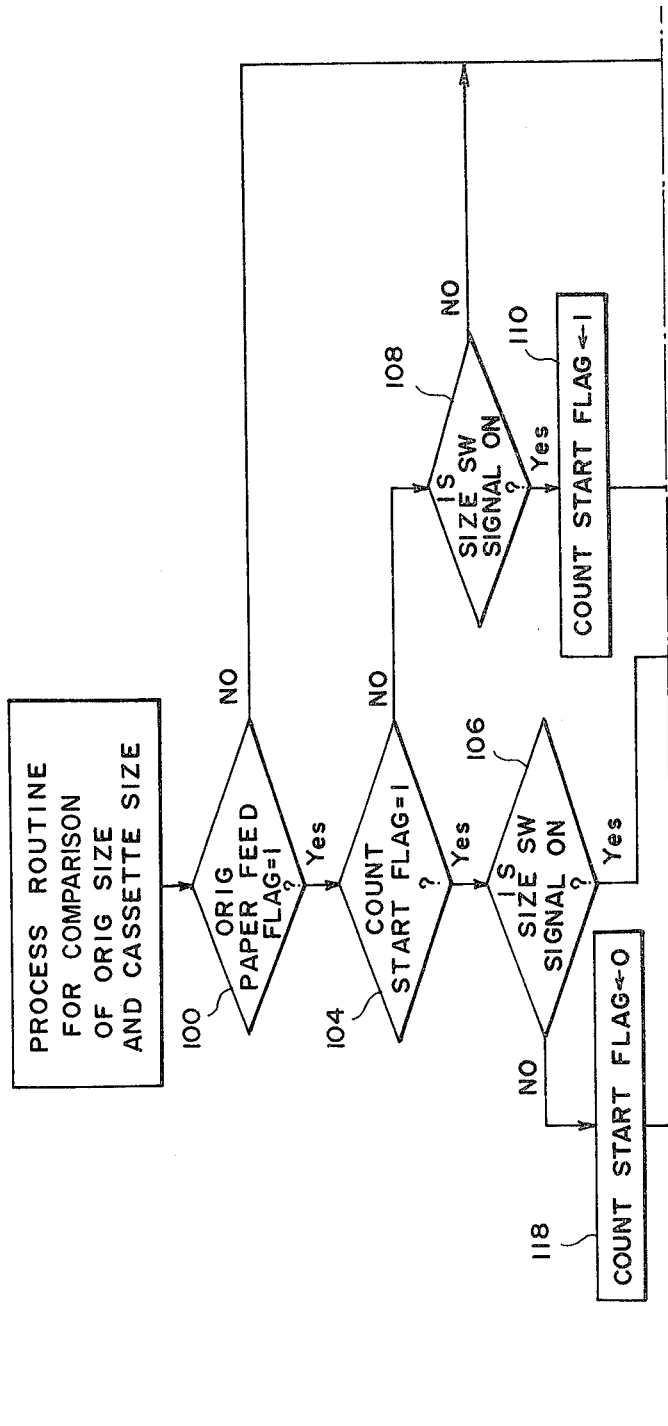

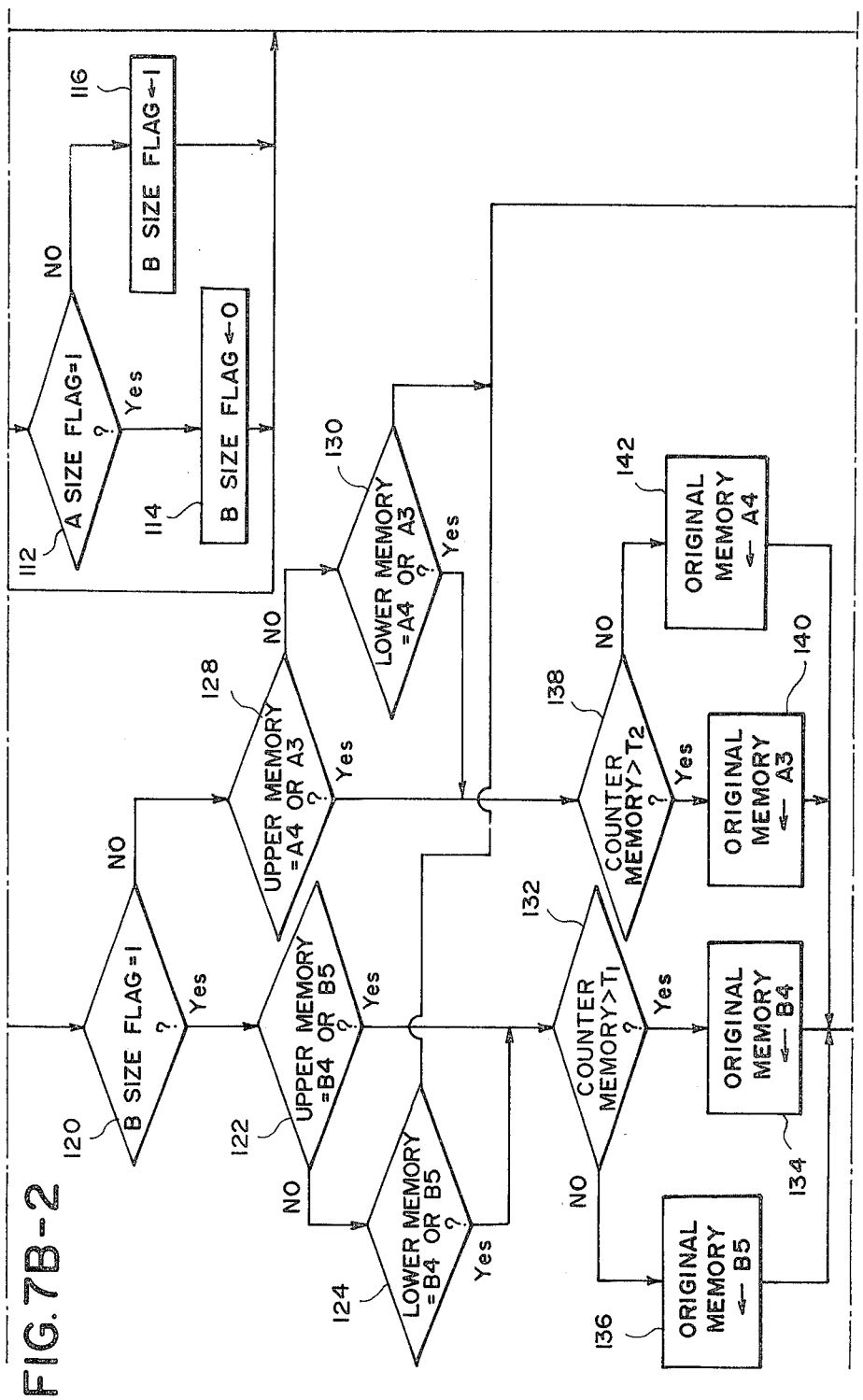

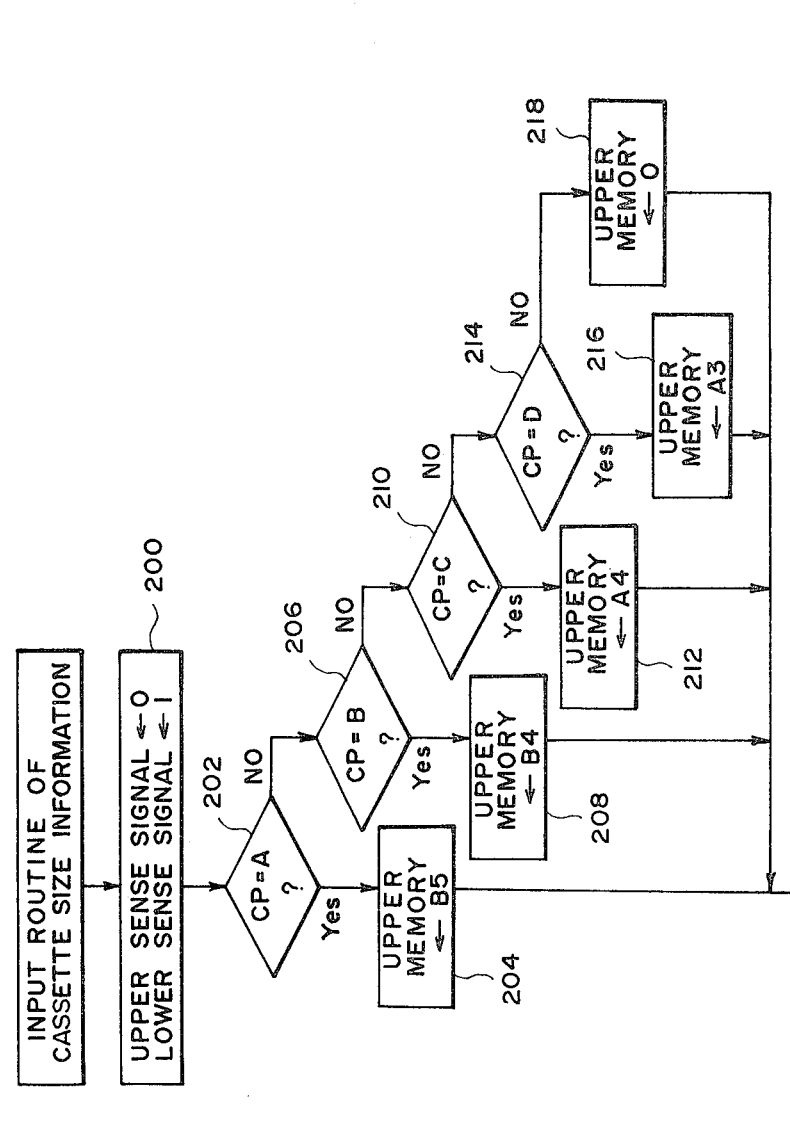

COPYING APPARATUS

BACKGROUND OF THE INVENTION

1. Field of the Invention

The present invention relates to a copying apparatus which senses the size of an original to be copied and which produces a copy of this original according to the sensed size.

2. Description of the Prior Art

Copying apparatuses are generally capable of reproducing images of an original on recording media such as recording paper sheets of various sizes. In order to select or change the size of the copying media, the operator sets a copying medium of desired size in the copying apparatus. In a copying apparatus in which copying media of different sizes can be set, the operator depresses a size selection switch or the like on a control panel in order to select or change the size of the copying medium.

However, with these conventional copying apparatuses, the operator himself must confirm the size of the original first and then set or select a copying medium of the corresponding size.

For this reason, when the operator erroneously sets or selects the size of the copying medium or forgets to do so, the image of the original is reproduced on a copying medium of inappropriate size, resulting in inefficient operation.

In view of this problem, a copying apparatus has been proposed which has an automatic selection mechanism for automatically selecting a copying medium of one size from recording media of a plurality of sizes in accordance with the sensed size of the original.

However, unlike the copying media, the originals have divergent shapes and sizes, so that the automatic selection mechanism may not properly function.

Other conventional copying apparatuses have been proposed such as a copying apparatus which has an ADF (Automatic Document Feeder) for automatically feeding an original to an exposure position, or a copying apparatus in which the operator places the original at the exposure position and covers it with an original mat. The former copying apparatus is advantageous in that time required for setting and resetting originals may be significantly reduced.

In addition to this advantage, the ADF also serves to improve the operability, to eliminate erroneous copying operations, and to eliminate loss or damage to the original during copying operations. The ADF thus facilitates the copying operation.

However, these advantages of the ADF are obtained only if originals of one size are fed to the exposure position. The size of the copying medium must be switched every time an original of different size is fed. Although such a switching operation itself is simple in procedure, it may be simply forgotton by the operator in a rather monotonous series of copying operations. The operator may find out his error only after the apparatus has reproduced a copy in a wrong size.

When the operator is not accustomed to the operation system of the apparatus, he or she may find out the error only after a plurality of copies has been reproduced in a wrong size. If the image of each original is reproduced on a plurality of copying media, such erroneous operation results in waste of the copying medium. This waste is further promoted since a copying apparatus with an ADF is generally a high-speed apparatus. Although such as erroneous operation may be eliminated to the minimum by training of the operators, it is, of course, preferable that the apparatus itself be capable of preventing such an error.

SUMMARY OF THE INVENTION

It is an object of the present invention to provide a copying apparatus which is improved in copying efficiency and which is capable of efficient operation control by sensing the size of an original.

It is another object of the present invention to provide a copying apparatus which selects a proper copying operation by sensing the size of an original and which is capable of performing a manual copying operation as required.

It is still another object of the present invention to provide a copying apparatus which is capable of clearly indicating the copying operation control status in accordance with the sensed size of an original.

It is still another object of the present invention to provide a copying apparatus with an ADF, which allows sensing of the size of an original.

The above and other objects and features of the present invention will become apparent from the following description of the invention.

BRIEF DESCRIPTION OF THE DRAWINGS

FIG. 5 shows an example of correspondence between the signals supplied to the input port CP shown in FIG. 3 and the cassette size;

DETAILED DESCRIPTION OF THE PREFERRED EMBODIMENTS

Figures 1, 7A:
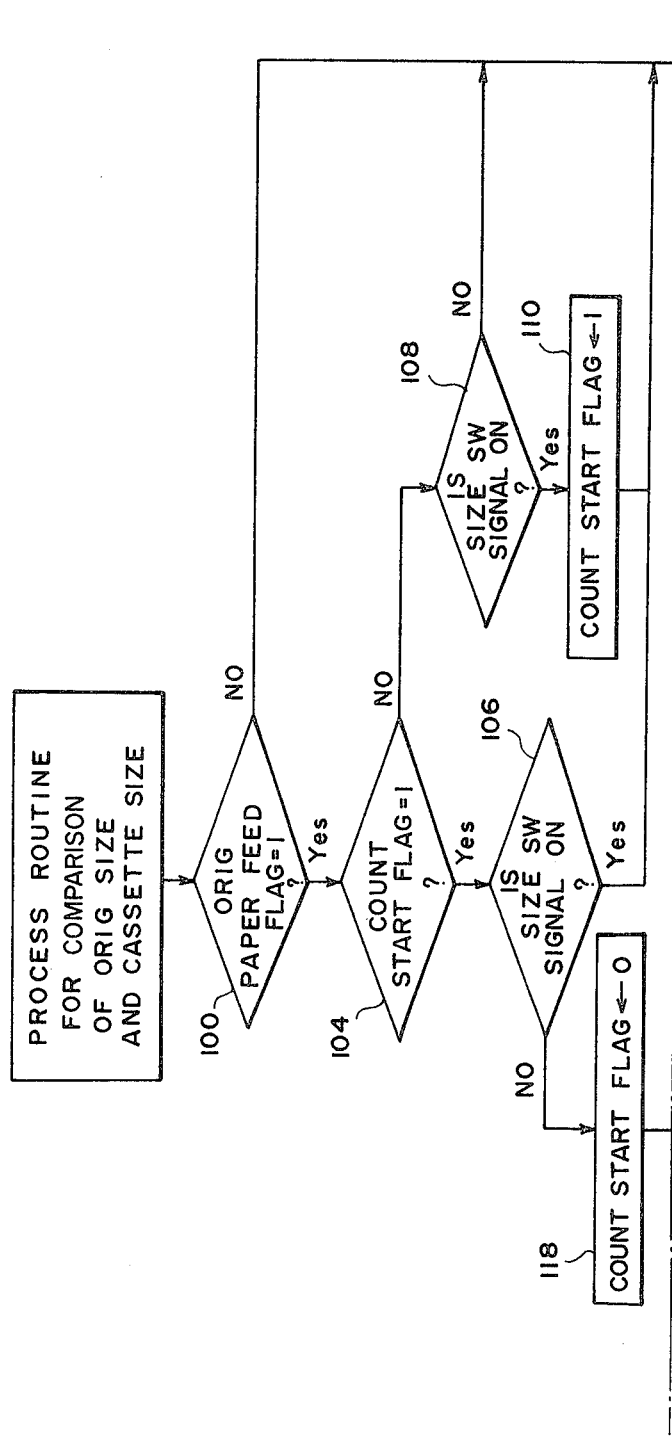
FIG. 1 is a sectional view showing the configuration of a copying apparatus including an ADF according to an embodiment of the present invention.
FIG. 7A composed of FIGS. 7A-1, 7A-2 and 7A-3 and FIG. 7B composed of FIGS. 7B-1, 7B-2 and 7B-3 are both flowcharts of a comparison routine of the original size information and the cassette size information.
Figures 2, 7A:
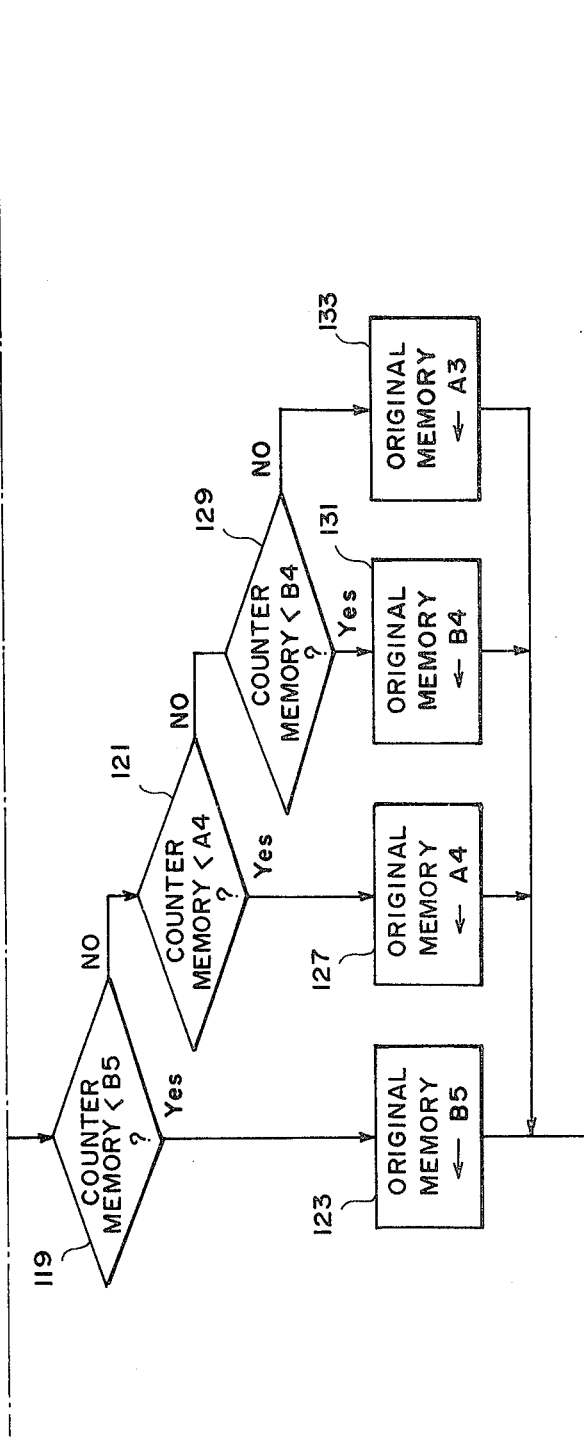
FIG. 2 is a partial, enlarged view of an original size sensing switch within the ADF shown in FIG. 1.
Figures 3, 7A:
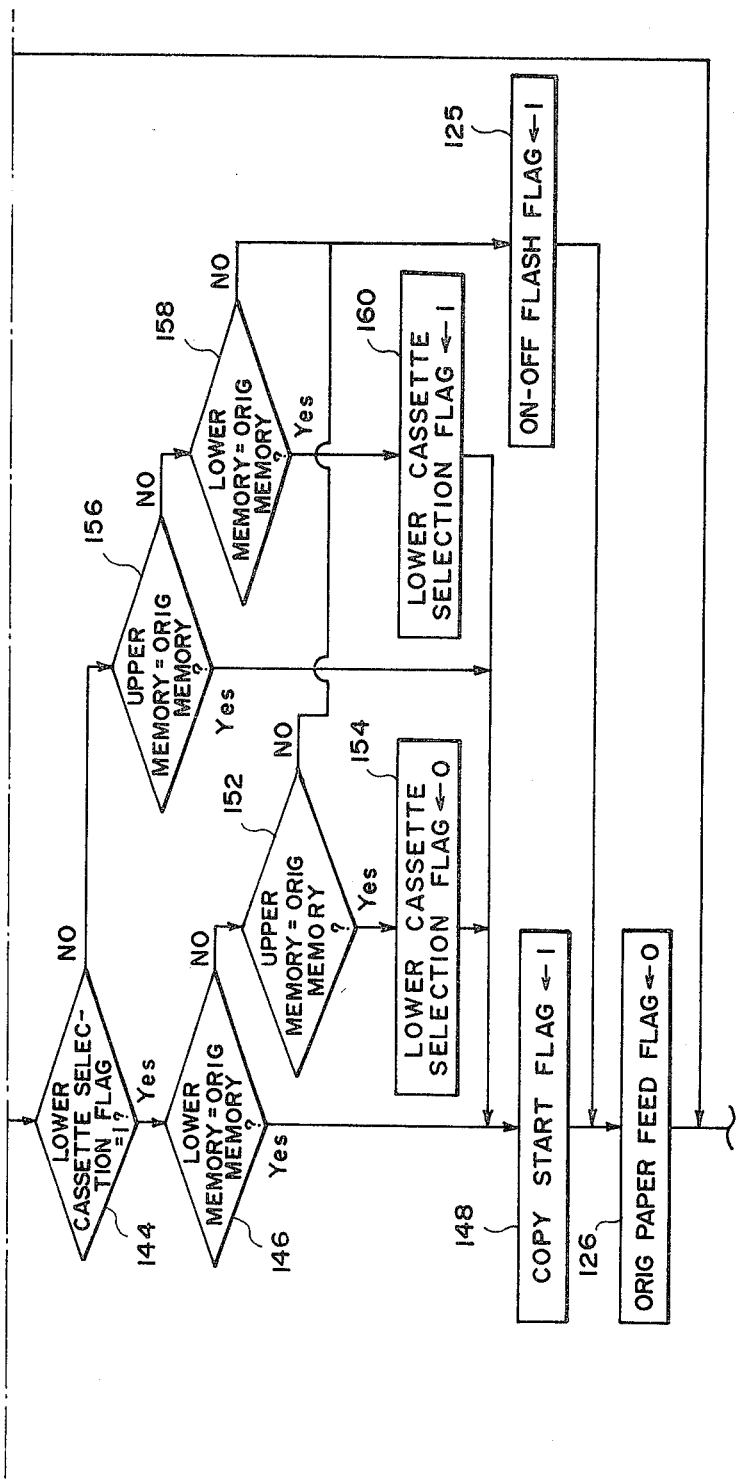

A preferred embodiment of the present invention will now be described with reference to the accompanying drawings. FIG. 1 is a view showing the configuration of a copying apparatus according to this embodiment of the present invention, while FIG. 2 is a partial, enlarged view of an original size sensing switch for sensing the size of an original or the like which is mounted in an ADF shown in FIG. 1.

The copying apparatus of this embodiment of the present invention has a copying apparatus main body 2 and an ADF 4. The control section of the apparatus has a microcomputer (e.g., μCOM 44 manufactured by NEC). A ROM in the microcomputer stores a control program for controlling the operation of the apparatus. A description will be made for the case wherein two cassettes for holding recording paper sheets are stacked in the upper and lower stages, respectively. The cassette size is used synonymously with the size of the recording paper sheets held therein.

Referring to FIG. 1, the ADF 4 and a console panel 16 with a manual switch, a display device and so on are arranged on the copying machine main body 2. When an original 18 is supplied to the ADF 4, the ADF 4 feeds it from an original setting portion 25 to an exposure surface 20 comprising a transparent plate of glass or the like. After being exposed to light from an exposure lamp 22 at the exposure surface 20, the original 18 is discharged to an original tray 24. An upper cassette 6 and a lower cassette 8 are mounted to the copying machine main body 2. A recording paper sheet 58 is selected from either the upper cassette 6 or the lower cassette 8. After transfer of the image of an original, the recording paper sheet 58 is discharged onto a discharge tray 48. According to the present invention, switches are described below are incorporated so as to measure the size of the original in its feeding direction. According to the measurement results, the copying operation is either continued or interrupted. A sheet mode switch 11 senses if the ADF 4 is located on the exposure surface 20. If the ADF 4 is in the operative position, the sheet mode switch 11 is closed to indicate the sheet mode. In the sheet mode, the image of an original is reproduced with the use of the ADF 4. If the part of the ADF 4 at the side of the sheet mode switch 11 is lifted, the switch 11 is opened to indicate the book mode. In the book mode, the image of an original is reproduced without the use of the ADF 4. An original set sensing switch 26 is disposed at the original setting portion 25 of the ADF 4 and senses if the original 18 is set at the portion 25. The original size sensing switch 10 is operated by the original 18 being disposed in the path from the original setting portion 25 to the exposure surface 20. The size of the original in the direction of its movement is measured by counting the number of reference pulses generated during an interval in which the switch 10 senses the presence of the original. FIG. 2 is a view of the original setting portion 25 from the side indicated by arrow X. As shown in FIG. 2, an original size classifying switch 36 is incorporated in the direction (transverse) perpendicular to the feeding direction of the original. The switch 36 operates to classify the size of the original into B sizes (B5 and B4) or A sizes (A4 or A3). The original size and the recording paper sheet size herein mean sizes in the feeding direction unless otherwise specified.

When the original is fed from the original setting portion 25 to the exposure surface 20, a counter starts counting the reference pulses after the original size sensing switch 10 senses the original. The counter stops counting the reference pulses when the original size sensing switch 10 no longer senses the original. A known means such as a microswitch or a combination of a magnet with a lead switch or the like may be used for sensing the recording paper sheet size or the cassette size. The apparatus shown in FIG. 1 has lead switches 12 and 14, the exposure lamp 22, reflecting mirrors 28 and 30, a lens 32, a photosensitive drum 34, pickup rollers 38, feed rollers 40, transfer rollers 42, a transfer pole 44, a fixing roller 46, a recording paper sheet size display lamp 50, an upper/lower cassette change-over switch 52 for allowing selection between the upper cassette and the lower cassette, a print switch 54 for initiating the copying operation, and a main switch 56 for turning ON/OFF the apparatus. When the ADF 4 is used, the original 18 is fed in the direction indicated by dotted lines. When the upper cassette 6 is selected, the recording paper sheet 58 is fed by the rollers 38, 40, 42 and 46 in the direction indicated by the solid line.

The original size information x (number of reference pulses) is expressed as:

$$x = \frac{D_2}{D_1} \times P_{B1}$$

where $D_1$ is the feeding speed of the recording paper sheet (mm/sec), $D_2$ is the feeding speed of the original (mm/sec), and $P_{B1}$ is the number of reference pulses counted during the interval in which the original size sensing switch is operative. The recording paper sheet size information (number of reference pulses) $x_A$ is expressed as:

$$x_A = \frac{K_A}{D_1} \times P_{B2}$$

where $K_A$ is the recording paper sheet size (mm) and $P_{B2}$ is the number of reference pulses counted per second. The original size information x and the recording paper sheet size information $x_A$ are both measured with reference to the feeding speed of the recording paper sheet. Therefore, the original size may be obtained by comparison of the original size information x with the recording paper sheet information $x_A$. Although $P_{B2}$ may change in practice, its changes are negligible. Only $P_{B1}$ is variable among the parameters involved in comparison of the information x with the information $x_A$.

If the original size in the direction (transverse) perpendicular to the feeding direction of the original is discriminated in addition to the original size in the feeding direction, the original size may be more correctly classified into A sizes and B sizes. Table 1 below shows the transverse size (column a) and the size in the feeding direction (column b) of the recording paper sheet. Only one switch is required for classification of the size into A or B sizes.

TABLE 1

|    | a      | b      |
|----|--------|--------|
| B5 | 257 mm | 182 mm |
| B4 | 257    | 364    |
| A4 | 297    | 210    |
| A3 | 297    | 420    |

If the original is of B (A) size, the original size need only compared with the B (A) size. If the cassette of B (A) size is not set, it is discriminated that a recording paper sheet of proper size is not set. In this embodiment, two (upper and lower) cassettes are set. If the cassettes of B (A) size are set for both stages, the comparison of the original size is made first with the cassette size which is selected before the current comparison. If the original size coincides with the previously selected cassette size, a comparison with the next cassette size need not be performed.

In the description made above, the original size information is compared with the recording paper sheet size on the basis of the number of reference pulses counted with reference to the feeding speed of the recording paper sheet. However, the reference pulses may be counted with reference to the feeding speed of the original. Assume that the recording paper sheet feeding speed is 160 mm/sec, the original feeding speed is 1,000 mm/sec and the reference pulse period is 10 msec. Then, we obtain:

TABLE 2

|    | c         | d      | e    |
|----|-----------|--------|------|
| B5 | 1.1375 sec| 113.75 | 18.2 |
| B4 | 2.275     | 227.5  | 36.4 |
| A4 | 1.3125    | 131.25 | 21.0 |
| A3 | 2.625     | 262.5  | 42.0 |

In Table 2 above, column c represents time (sec) required for a recording paper sheet of each size to pass through a fixed point when it is fed at the speed mentioned above. Column d above represents the recording paper sheet information $x_A$ (number of reference pulses) with reference to the recording paper sheet feeding speed. Column e represents the recording paper sheet size 600/1000 $\times_A$ (number of reference pulses) with reference to the original feeding speed. It is seen from columns b and e that one pulse is counted per 10 mm of the recording paper sheet. Therefore, the next method may be adopted for discriminating the recording paper sheet size. According to this method, if the original is of B sizes, the original size is compared with $T_1$ which satisfies an inequality $18.2 < T_1 > 36.4$. If the original is of A sizes, the original size is compared with $T_2$ which satisfies an inequality $21.0 < T_2 > 42.0$. If the original size (count value of the counter) is greater than $T_1$ in the case of B sizes, the original size is discriminated to be of B4 size. If the count is smaller than $T_1$, the original size is discriminated to be of B5 size. The same applies to A sizes. The recording paper sheet size optimal for an original is discriminated in this manner and is compared with the recording paper sheet size information from the upper and lower cassettes. If a recording paper sheet of appropriate size is available in the set cassette, this cassette is automatically selected.

There may be cases wherein the original size cannot be correctly sensed by the discrimination algorithm using $T_1$ and $T_2$. If $T_1$ is an intermediate value, that is, $(18.2+36.4)/2 \approx 27$ in the case of B sizes, a recording paper sheet of B5 size is selected after counting 26 reference pulses. In this case, the image on an original which is about 80 mm longer than B5 size (80 mm corresponds to $26-18.2 \approx 8$ (pulses)) is reproduced on a recording paper sheet of B5 size. Various measures may be taken in order to solve this problem. For example, in the case of B sizes, the count of the counter is compared with $T_{10} (18.2 < T_{10})$ and with $T_{11} (36.4 < T_{11})$. If the count is greater than $T_{10}$, the original is discriminated to be of B5 size. If the count is smaller than $T_{11}$, it is discriminated that the original size does not coincide with recording paper sheets of any size available. In this case, the recording paper sheet size display lamp is flashed to indicate to the operator that the automatic selection function of the cassette is released. According to this indidation, the operator manually selects a recording paper sheet of optimum size for copying.

According to this embodiment, $T_1$ and $T_2$ are determined according to the following procedure. In the case of B sizes, if the original size is greater than B5 size by about 30 mm (if the count exceeds the number of pulses corresponding to B5 size by the number of pulses corresponding to about 30 mm), B4 size is selected. In the case of A sizes, if the original size exceeds A4 size by about 30 mm (if the count exceeds the number of pulses corresponding to A4 size by the number of pulses corresponding to about 30 mm), A3 size is selected. This procedure is adopted in consideration of the following points. First, since the original feeding speed is very fast, the error involving the reference pulses is great. The original size tends to be erroneously discriminated to be of greater size than of smaller size. Furthermore, most of the originals are of standard sizes (A3, A4, B4 and B5).

Figure 3:
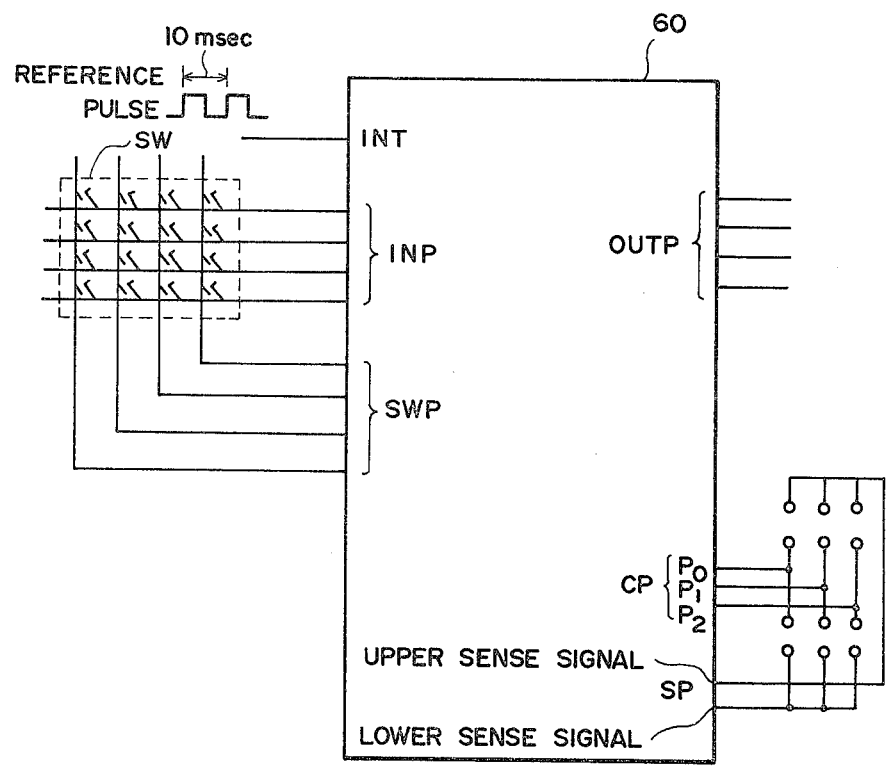
FIG. 3 is a view showing input/output ports for a microcomputer used according to the present invention.
Figure 4:
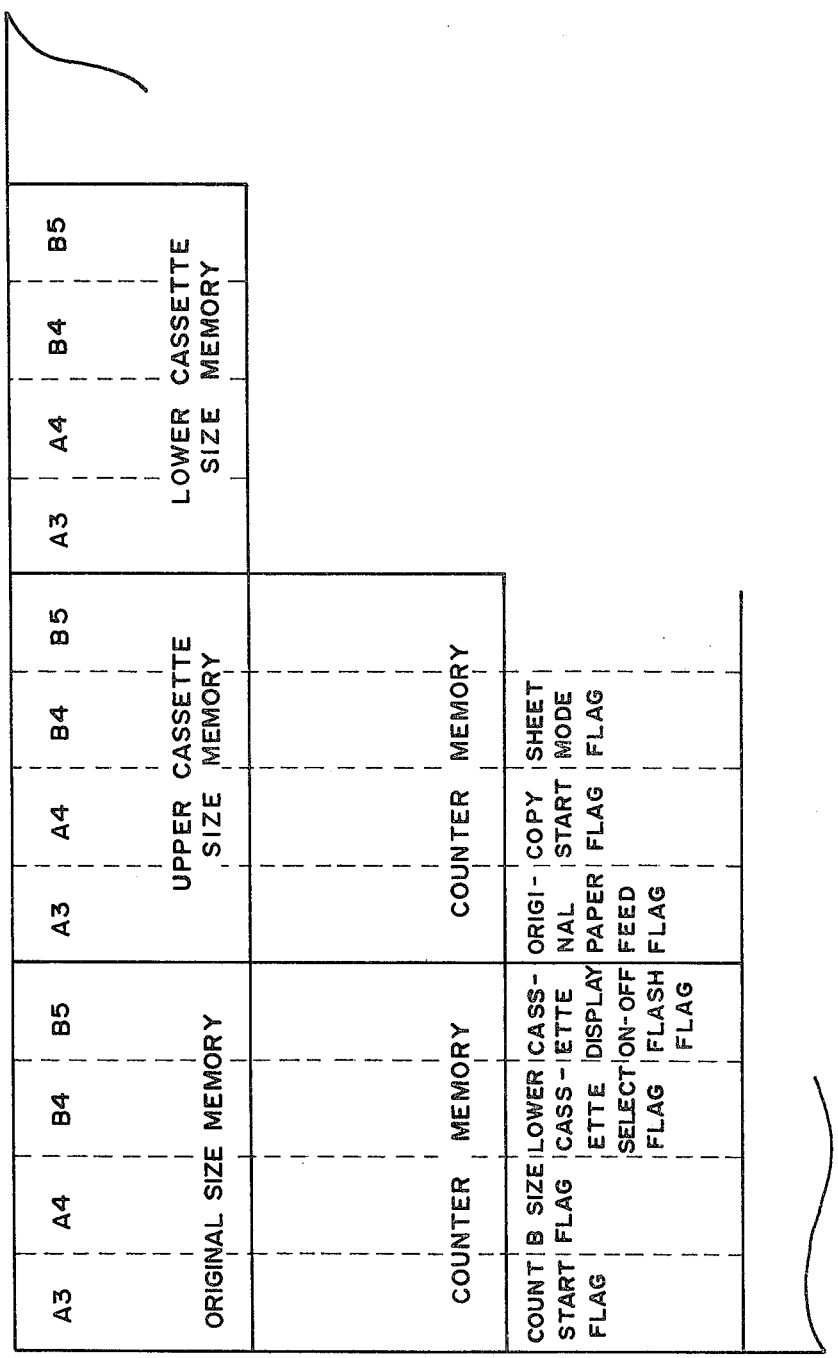
FIG. 4 shows the contents of a RAM in the microcomputer shown in FIG. 3.

FIG. 3 is a view showing the connection of the input-/output ports of a microcomputer used in the embodiment of the present invention. FIG. 4 shows the contents of a RAM of the microcomputer shown in FIG. 3. FIG. 5 shows an example of correspondence between signals $P_0$, $P_1$ and $P_2$ input to the input port CP with recording paper sheet sizes A, B, C and D. When the power switch is turned on, a control program stored in a ROM of the microcomputer shown in FIG. 3 is executed. Statuses of input signals from various switches are constantly monitored. The control program is executed according to the monitored statuses of the input signals to control the operation sequence of the copying apparatus.

As shown in FIG. 3, a microcomputer chip 60 has an interrupt terminal INT for receiving the reference pulses of 10 msec period; an input port INP for receiving signals from the switches 10, 11, 26 and 36 of the ADF 4 or the switches 50, 52, 54 and 56 on the console panel 16; output port SWP for outputting a sense signal to these switches, on output port OUTP for outputting signals to feed mechanisms for the original and the recording paper sheet and to a control for the photosensitive body; the input port CP for receiving a cassette size signal from the cassette; and an output port SP for out-putting an upper cassette sense signal and a lower cassette sense signal to the upper and lower cassettes 6 and 8, respectively.

The microcomputer chip 60 has the ROM storing the control program and the RAM which allows read-/write operations of data. As shown in FIG. 4, the RAM further has an original size memory for storing the original size information (storing "1" in one bit corresponding to B5, B4, A4 or A3 size after comparison of the original size with $T_1$ or $T_2$), upper and lower cassette size memories for storing "1" in one bit corresponding to A3, A4, B4 or B5 size in accordance with the cassette size information obtained from the upper or lower cassette sense signal and the input signals $P_0$, $P_1$, and $P_2$ supplied to the input port CP, counter memories which increment their counts by one at every cycle of the reference pulses supplied to the interrupt terminal INT, a memory for storing flags (a counter start flag, a B size flag, a lower cassette select flag, a cassette display ON-OFF flash flag, an original feed flag, a copy start flag, and a sheet mode flag, and so on.

Figure 6:
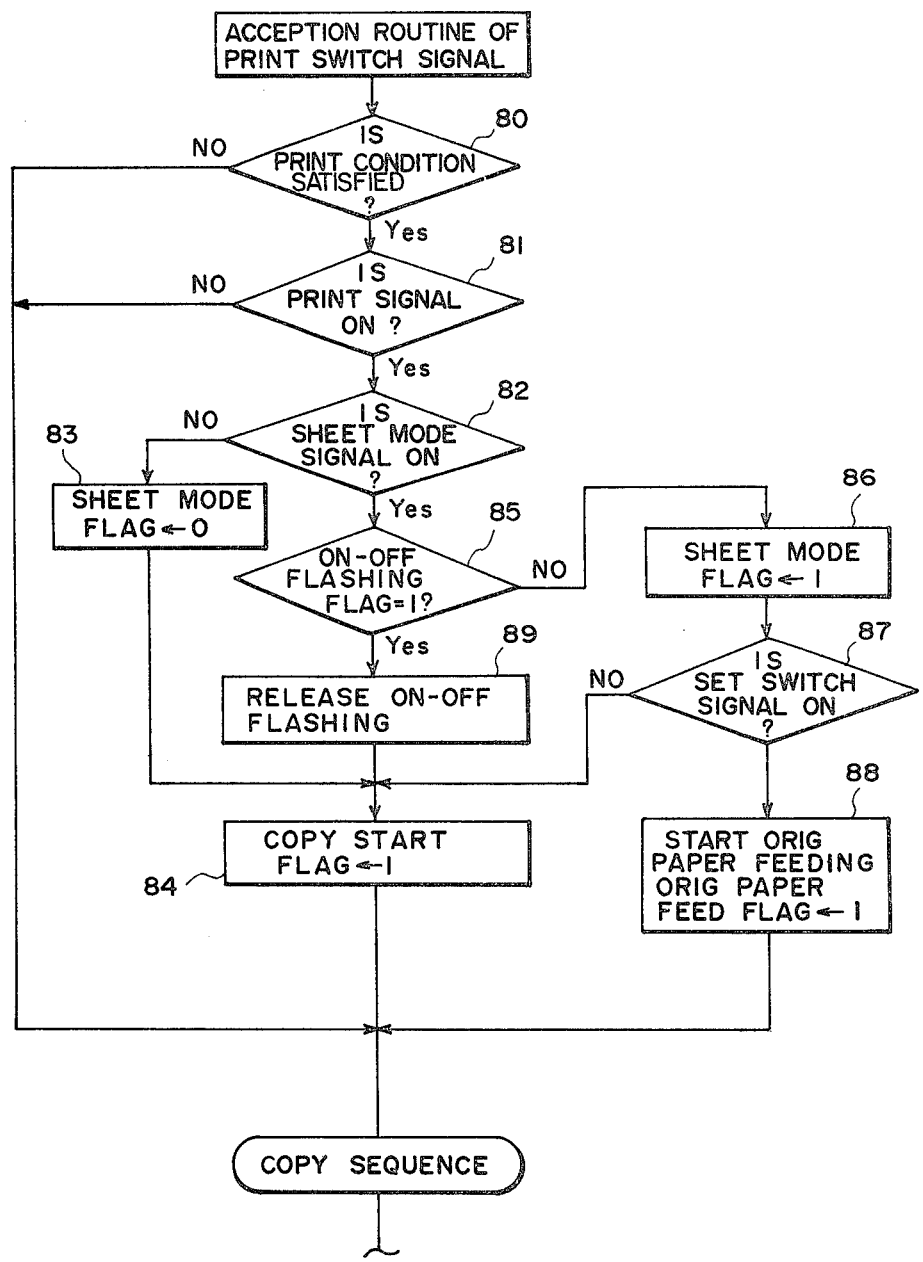
FIG. 6 shows a flowchart of an accept routine of a print switch signal.
Figures 3, 7B:
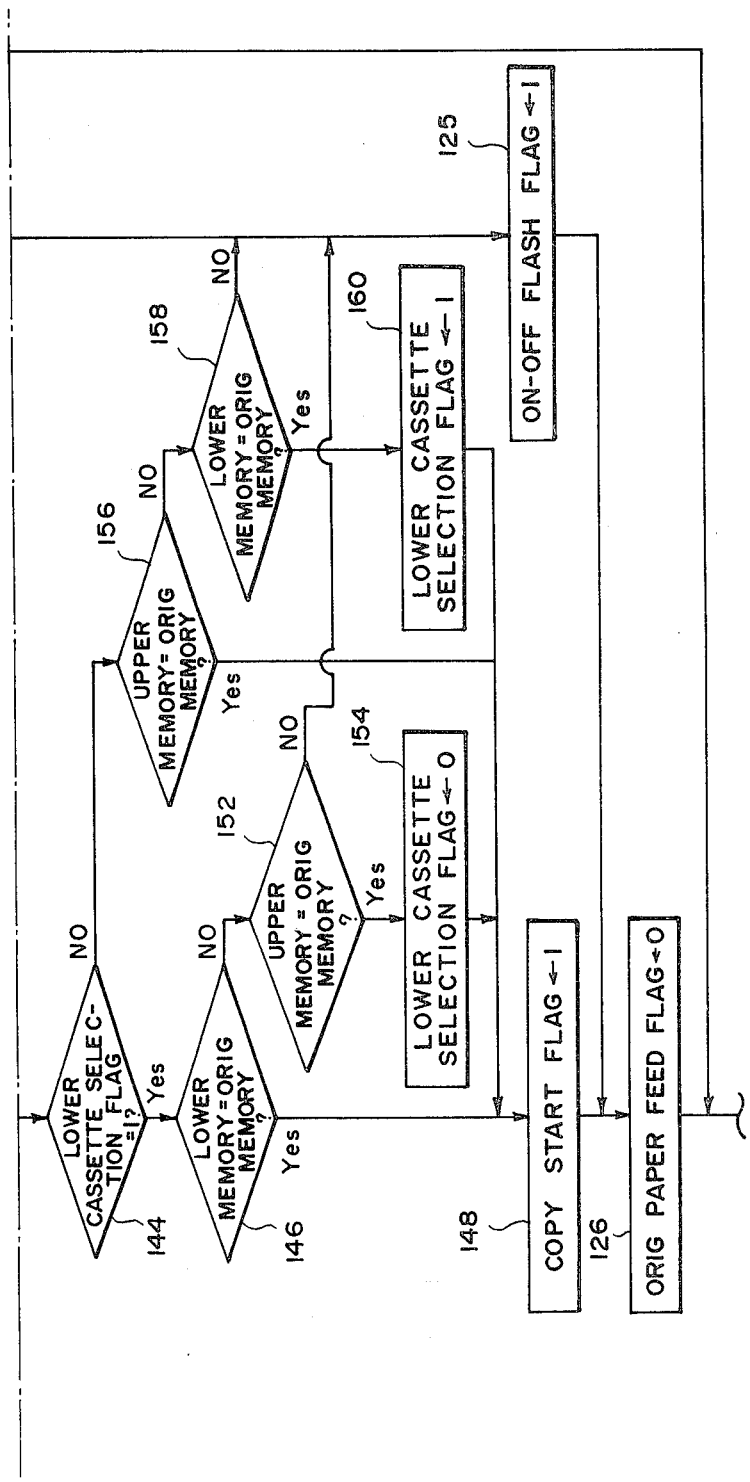
Figure 8:
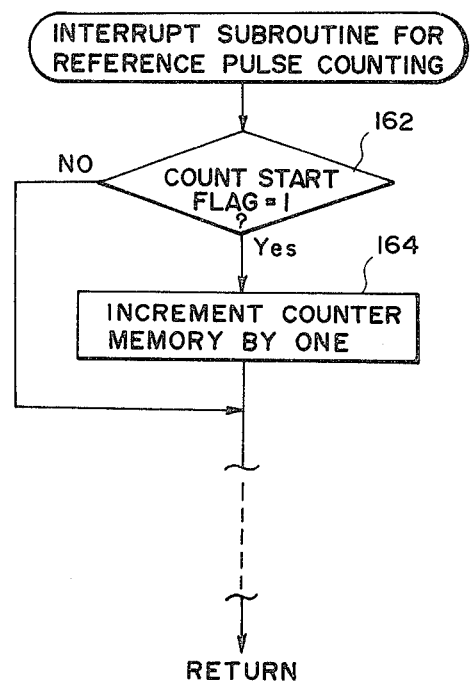
FIG. 8 is a flowchart of an interrupt subroutine for counting reference pulses in the comparison routine shown in FIG. 7.
Figure 9:
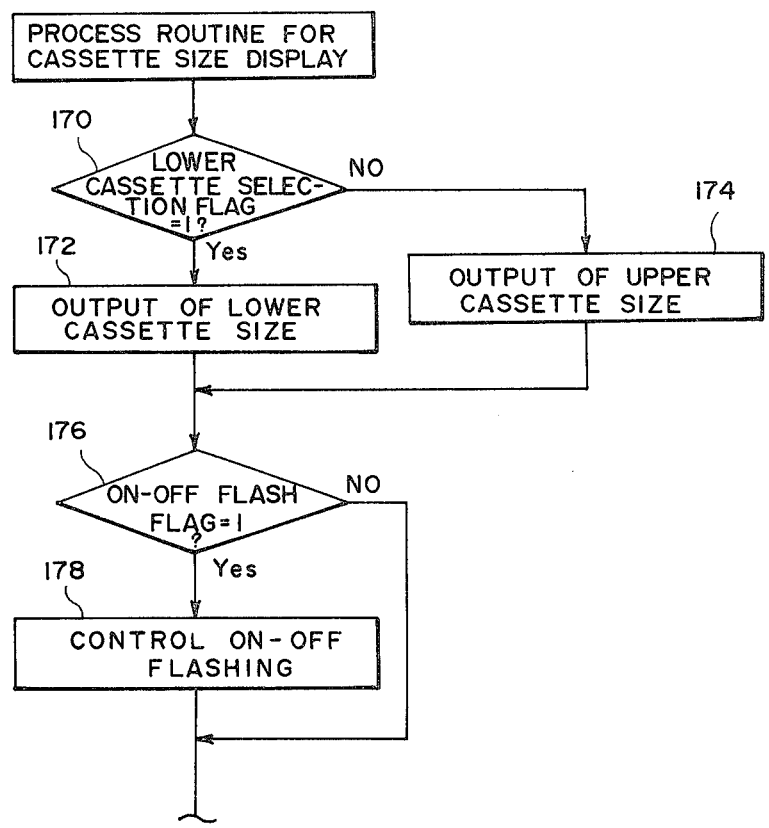
FIG. 9 is a flowchart of a cassette size display routine when a cassette of an appropriate size is not set.
Figure 10:
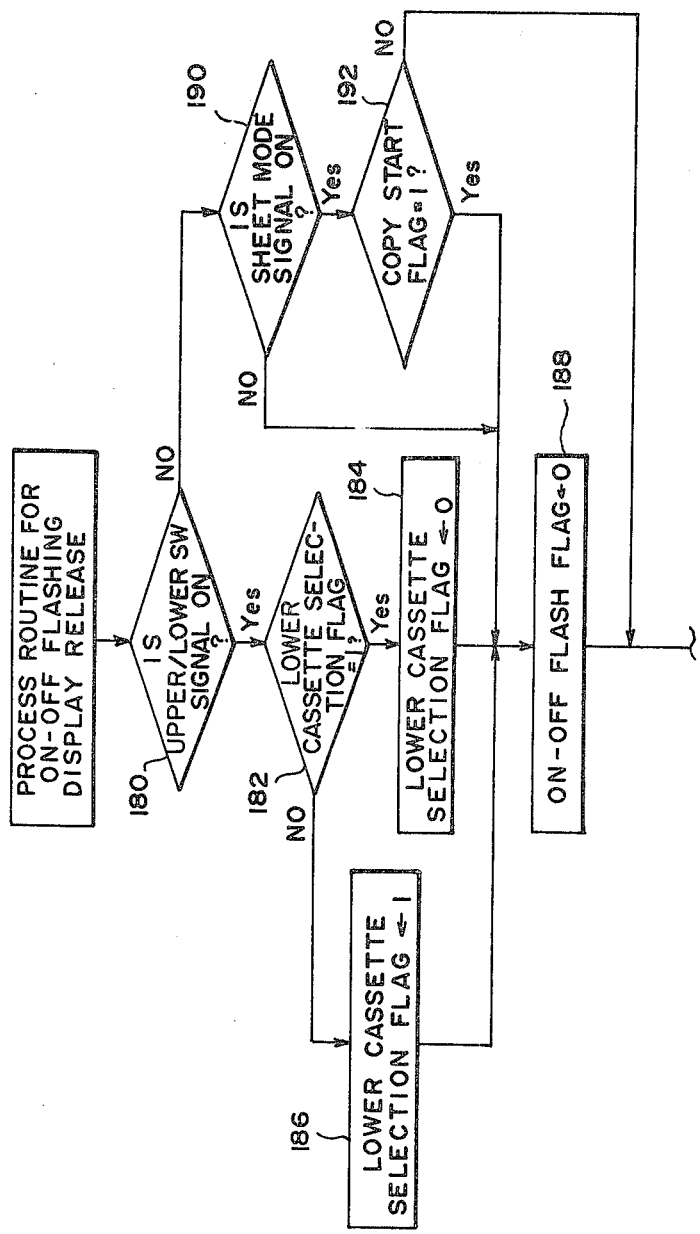
FIG. 10 is a flowchart of an ON-OFF flashing display release routine when a cassette of an appropriate size is not set.
Figure 11B:
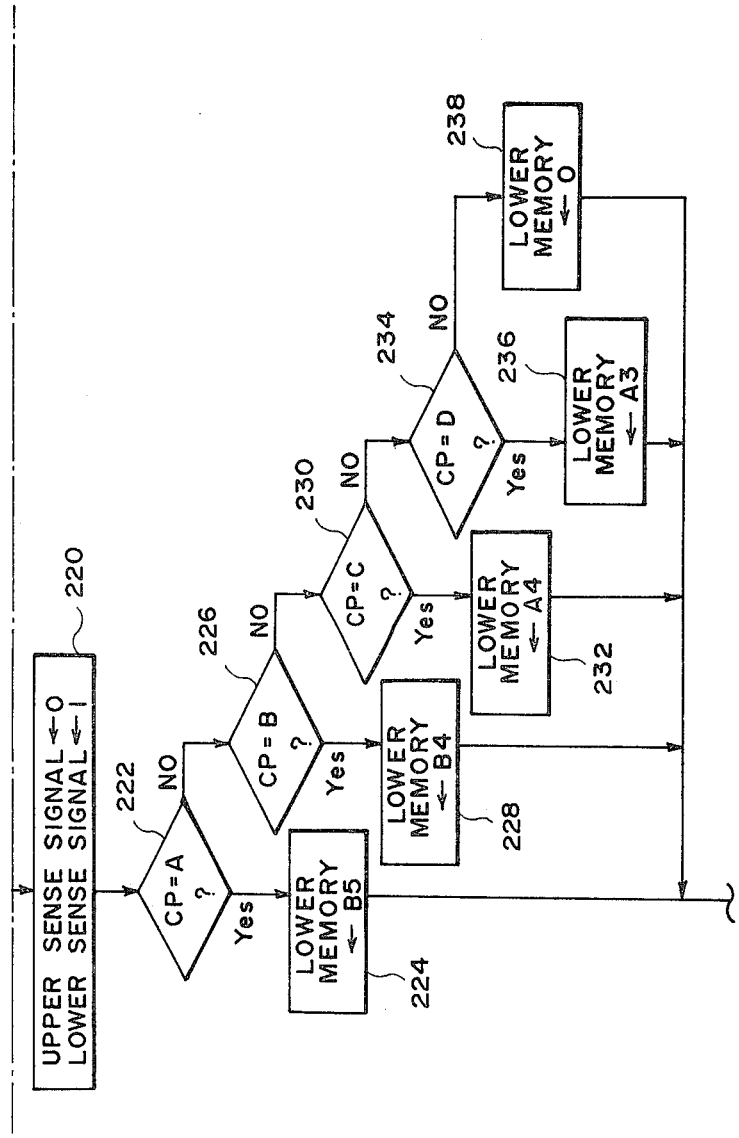
FIG. 11 composed of FIGS. 11A and 11B are flowcharts of an input routine of cassette size information in an upper or lower cassette size memory shown in FIG. 4 according to the correspondence shown in FIG. 5.

FIG. 6 is a flowchart of an accept routine of a print switch signal. FIGS. 7A and 7B are flowcharts of processing routines for comparison of the original size and the cassette size. FIG. 8 is a flowchart of an interrupt subroutine for reference pulse counting in the routine shown in FIG. 7. FIG. 9 is a flowchart of a processing routine for cassette size display and for processing when the cassette of the size corresponding to that of the original is not set. FIG. 10 is a flowchart of a processing routine for ON-OFF flashing display release when the flash display is performed and the copying operation is interrupted since the cassette of the appropriate size is not set. FIG. 11 is a flowchart of an input routine of cassette size information into the upper or lower cassette size memory shown in FIG. 4 in accordance with the correspondence between the cassette size and the input signal supplied to the input port CP. The routines or subroutines shown in FIGS. 6 to 11 constitute a control program for the copying apparatus.

Referring to FIG. 6 if YES in step 80 for discriminating if the print condition is satisfied (e.g., the door is closed or the fixing rollers are at a predetermined temperature) and YES in step 81 for discriminating if a print switch signal is input through the print switch 54, it is then discriminated in step 82 if the ADF 4 is set at a predetermined position through detection of the status of the sheet mode signal input through the sheet mode switch 11. If the sheet mode signal is OFF in step 82, the sheet mode flag in the RAM is reset, indicating that the book mode is initiated. A copy start flag is then set in the RAM in step 84. Then, the flow advances to the sequence control of the copying processing for feeding a recording paper sheet from the cassette selected by the upper/lower cassette change-over switch 52 and for forming the image of an original on the fed recording paper sheet. According to the embodiment of the present invention, the sequence control of the copying process includes control operations of feeding of a recording paper sheet, lighting up of the exposure lamp, driving of the photosensitive body, charge/transfer/discharge operations, driving of the developing roller, and so on. Since these control procedures are not directly related to the present invention and are moreover known to the skilled in the art, a description thereof will be omitted herein.

If the sheet mode signal is ON in step 82, it is judged that the ADF 4 is in its operative condition. Then, in step 85, it is discriminated if the cassette display ON-OFF flash flag is "1". This is to check that any discrimination indicating the absence of a cassette of appropriate size has been released before depression of the print switch 54. If the cassette display ON-OFF flash flag is "1" in step 85, the flashing operation is released in step 89 and the copy start flag is set in step 84. Then, the flow advances to the sequence control of the copying operation. The flashing operation is released in step 89 by depression of the print switch by the operator since copying on a recording paper sheet of an inappropriate size is acceptable or by depression of the print switch by the operator after setting a cassette of the proper size in place of a cassette of the inappropriate size.

If the cassette display ON-OFF flash flag is "0" in step 85, the sheet mode flag is set in the RAM in step 86. It is then discriminated in step 87 if the set switch signal from the original set sensing switch 26 is ON. If NO in step 87, it is judged that copying is performed without the ADF 4. The copy start flag is set in the RAM in step 84, and the flow advances to the sequence control of the copying operation. If the set switch is ON in the step 87, feeding of the original to the exposure surface is started and an original feed flag is set in the RAM, in step 88. The flow then advances to the sequence control for the copying operation.

FIGS. 7A-1, 7A-2 and 7A-3 show the flowchart of the processing routine for comparison of the original size and the cassette size at the beginning of the sequence control for the copying operation.

Referring to FIG. 7A, it is discriminated if the original feed flag is "1" in step 100. The original feed flag is "1" if the original is fed in step 88.

If YES in step 100, it is then discriminated in step 104 if the count start flag is "1". If NO in step 104, it is discriminated in step 108 if a size switch signal is input through the original size sensing switch 10. If YES in step 108, a count start flag is set in the RAM in step 110. From step 110, the flow advances to an interrupt subroutine for reference pulse counting shown in FIG. 8. Referring to FIG. 8, it is discriminated in step 162 if the count start flag is "1". Where step 162 is YES, the count of the counter is incremented by one at the trailing edge of each reference pulse in step 162. The counter continues to count the reference pulses until the count start flag is reset.

On the other hand, if NO in step 104, it is then discriminated in step 106 if the original size sensing signal is ON. If NO in step 106, the count start flag is reset in step 118, the original size is discriminated to be of one of B5, B4, A4 and A3 sizes in steps 119, 121, 129 and 133 according to the count obtained in the subroutine shown in FIG. 8. Although the original size may not always be the same as one of these standard sizes, the original size is discriminated in this manner since most of the originals are of one of these sizes. As has been described above, since more errors occur in discriminating the original to be of a larger size rather than to be of smaller size. For this reason, the number of pulses corresponding to the original size is preferably compared with the numbers slightly greater than those shown in column e in Table 2 above. After the original size is discriminated in steps 119, 121, 129 and 133, a flag is stored in corresponding bits of the original size memories shown in FIG. 4 in steps 123, 127, 131 and 133, respectively.

It is then discriminated in step 144 if the lower cassette select flag is "1". Thus, it is discriminated which one of the cassettes is selected through the upper/lower cassette change-over switch 52. If YES in step 144, it means that the lower cassette is selected. If NO in step 144, it means that the upper cassette is selected (FIG. 9). According to this embodiment, a method is adopted according to which the contents of the memories of the RAM are all cleared to zero when the main switch 56 is turned on. For this reason, upon turning on of the power switch, the contents of the recording paper sheet size display lamp 50 indicate the selection of the upper cassette. A change-over is made between the upper and lower cassettes every time the upper/lower cassette change-over switch 52 is depressed (FIG. 10).

If YES in step 144 in FIG. 7A, the lower cassette is discriminated to have been selected. It is then discriminated in step 146 if the data stored in the lower cassette size memory in the RAM is equal to the data of the original size memory. If YES in step 146, a copy start flag is set in step 148 to start the sequence control of the copying operation. If NO in step 146, it is discriminated in step 152 if the data stored in the upper cassette size memory in the RAM is equal to the data stored in the original size memory. If YES in step 152, the lower cassette select flag is reset in step 154 to select the upper cassette. Then, the copy start flag is set in step 148 to start the control sequence of the copying operation. If NO in step 152, it is judged that a cassette of proper size is not set and a cassette display ON-OFF flash flag is set in step 125. In this case, although the original is fed to the exposure position, the copying operation is not performed since the lower cassette flag is not set.

If NO in step 144, the upper cassette is discriminated to have been selected. In the order opposite to the case of YES in step 144, the data of the original size memory is compared with the data stored in the upper cassette size memory in step 156 and with the data stored in the lower cassette size memory in step 158. Since the flow of control in steps 156 to 160 is easily understood from the above description, a description thereof will be omitted.

FIG. 7B is a flowchart of a comparison routine of the original size and the cassette size. The comparison routine includes a step for measuring the size of the original in its feeding direction and a step for classifying the original into A and B sizes according to the size of the original in the transverse direction.

As in the case of the flowchart shown in FIG. 7A, in the flowchart shown in FIG. 7B, it is first discriminated in step 100 if the original paper sheet flag is set. If YES in step 100, it is then discriminated in step 104 if the count start flag is set in the RAM. If NO in step 104, it is discriminated in step 108 if the size switch signal is input through the original size sensing switch 10. If YES in step 108, a count start flag is set in the RAM in step 110. In step 112, it is discriminated if the A size flag is set by the original size classifying switch 36. If YES in step 112, the B size flag in the RAM is reset in step 114. On the other hand, if NO in step 112, the B size flag is set in step 116. After the leading edge of the original is sensed and the count start flag is set in step 110, the counter starts counting according to the interrupt subroutine shown in FIG. 8 as in the case of the routine shown in FIG. 7A. While the count start flag is set, it is discriminated in step 106 if the size switch signal is input through the original size sensing switch 36. When the size switch signal is input through the original size sensing switch 10, that is, when the trailing edge of the original is sensed, the count start flag is reset in step 118 to stop the counting operation of the counter. It is discriminated in step 120 if the B size flag is set.

If YES in step 120, the original is judged to be of a B size, and it is discriminated in steps 122 and 124 if the data of B4 or B5 size is stored in the upper cassette size memory or the lower cassette size memory. If the B5 or B4 size flag is not set in these memories, it is judged that no cassette of proper size is set and a cassette display ON-OFF flash flag is set in step 125. According to the processing routine for cassette size display shown in FIG. 9, the recording paper sheet size display lamp 50 is made to flash. The original feed flag is reset in step 126. A copy start flag is not set, and the copying operation is not performed.

If NO in step 120, the original is judged to be of an A size, and it is discriminated in steps 128 and 130 if the data of A3 or A4 size is stored in the upper cassette size memory or the lower cassette size memory in the RAM. If the A3 or A4 size flag is not set in these memories, the cassette display ON-OFF flash flag is set in step 125 and the copying operation is not executed, as in the case of the B sizes described above.

If YES in step 122 or 124, it is discriminated in step 132 if the count of the counter is greater than $T_1$. If YES in step 132, the original size is judged to be of B4 size, and the data of B4 size is set in the original size memory in the RAM in step 134 ("1" is set in the bit of B4 size and "0" is stored in the remaining bits of the original size memory). If NO in step 132, the original size is judged to be of B5 size, and the data of B5 size is set in the original size memory of the RAM in step 136.

Similarly, if YES in step 128 or 130, it is discriminated in step 138 if the count of the counter is greater than $T_2$. If YES in step 138, the original size is judged to be of A3 size, and the data of A3 size is stored in the original size memory of the RAM in step 140. On the other hand, if NO in step 138, the original size is judged to be of A4 size, and the data of A4 size is set in the original size memory of the RAM in step 142. Steps 144 to 160 in FIG. 7B are performed in the similar manner as in FIG. 7A, and a detailed description thereof will be omitted.

FIG. 9 shows a flowchart of the processing routine for cassette size display. Referring to FIG. 9, it is first discriminated in step 170 if a lower cassette select flag is set in the RAM. If YES in step 170, the lower cassette size signal is output for display in step 172. If NO in step 174, the upper cassette size signal is output for display in step 174. It is then discriminated in step 176 if a cassette display ON-OFF flash flag is set in the RAM in step 176. If YES in step 176, the recording paper sheet size display lamp is made to flash in step 178. If NO in step 176, the flow advances to the next step with the normal display.

FIG. 10 is a flowchart of a processing routine for ON-OFF flash display release when the flash display is performed to indicate that a cassette of a proper size is not available and the copying operation is not performed. In this state, the original is placed on the exposure surface, and the recording paper sheet size display lamp 50 indicates by flashing the size of the selected cassette. The method for releasing the flashing operation of the lamp has three alternatives according to the present invention. According to the first alternative, the upper/lower cassette change-over switch 52 is depressed. According to the second alternative, the sheet mode switch 11 is deenergized (or the ADF 4 is released). According to the third alternative, the print switch 54 is depressed. These three alternatives may be freely selected by the operator. The first alternative corresponds to the case wherein the operator realizes that the indicated size is inappropriate and depresses the upper/lower cassette change-over switch to select another cassette in place of the currently selected cassette. The second alternative corresponds to the case wherein the sheet mode switch is deenergized to remove the set original. The third alternative corresponds to the case wherein the operator judges that a recording paper sheet of inappropriate size may be used or depresses the print switch after setting a cassette of appropriate size in place of the currently selected cassette.

According to the first and second alternatives, as shown in FIG. 10, it is first discriminated in step 180 if an upper/lower cassette switch signal is ON. If YES in step 180, it is discriminated in step 182 if a lower cassette select flag is set in the RAM. If YES in step 182, the lower cassette flag is reset in step 184 to switch to the upper cassette. In step 188, the cassette display ON-OFF flash flag is reset to terminate the flashing operation of the lamp.

If NO in step 180, it is discriminated in step 190 if a sheet mode switch signal is ON. If NO in step 190, since the sheet mode switch is open, the cassette display ON-OFF flash flag is reset in step 188 to terminate the flashing operation. If YES in step 190, it is discriminated in step 192 if a copy start flag is set. If YES in step 192, the cassette display ON-OFF flash flag is reset in step 188 to terminate the flashing operation. If NO in step 192, the flow advances to the next routine. According to the third alternative, the flow advances to the next routine. According to the third alternative, the flow advances as described with reference to FIG. 6. Thus, it is possible to resume the copying operation without resetting the original which is already fed to the exposure position.

FIG. 11 is a flowchart of an input routine of the cassette size information into the upper cassette size memory and the lower cassette size memory in the RAM. In step 200, the upper cassette sense signal at an output port SP is reset and the lower cassette sense signal is set to start inputting the upper cassette size information. It is then discriminated in step 202 if the signals ($P_0$, $P_1$ and $P_2$) at the input port CP are data A as shown in FIG. 5. If YES in step 202, the data of B5 size is stored in the upper cassette size memory (the bit of B5 size is set) in step 204. If NO in step 202, it is discriminated in step 206 if the data at the input port CP is data B. If YES in step 206, the data of B4 size is stored in the upper cassette size memory in step 208. If NO in step 206, it is discriminated in step 210 if the data at the input port CP is data C. If YES in step 210, the A4 size data is stored in the upper cassette size memory in step 212. If NO in step 210, it is discriminated in step 214 if the data at the input port CP is data D. If YES in step 214, the data of A3 size is stored in the upper cassette size memory. If NO in step 214, it is judged that a cassette is not set in the upper stage, and all the bits of the upper cassette size memory are reset in step 218. In this manner, the size of the set cassette is discriminated according to the status of the signal at the input port CP, and a signal "1" is stored at the corresponding bit of the size bits (B5, B4, A4 and A3) of the upper cassette size memory.

In step 220, the upper cassette sense signal at the output port SP is set, and the lower cassette sense signal is reset to start inputting the lower cassette size information. It is first discriminated in step 222 if the signals ($P_0$, $P_1$ and $P_2$) of the input port CP are data A (FIG. 5). If YES in step 222, the data of B5 size is stored in the lower cassette size memory in step 224. If NO in step 222, it is discriminated in step 226 if the data at the input port CP is data B. The similar procedure is repeated (steps 226 to 238) to complete inputting the cassette size information.

In this manner, a signal "1" is stored at the corresponding bit of the upper and lower cassette size memories according to the status of the data at the input port CP. When the original is fed to the ADF, the cassette size data is compared with the original size data ("1" at the corresponding bit) as shown in FIG. 7 for selecting an appropriate cassette.

According to this embodiment, in the sheet mode which utilizes the automatic feeding mechanism of the ADF, the original feeding operation and the copying operation are started only after the original is set at a predetermined position on the ADF and the print switch is depressed. However, the present invention is applicable to a copying apparatus of the type wherein the original feeding operation and the copying operation may be started after the original is set at the predetermined position on the ADF.

The present invention is similarly applicable to a copying apparatus which allows simultaneous setting of three or more cassettes.

In the embodiment described above, the sheet mode switch to select the copying mode with the ADF is operated according to the set status of the ADF. However, the sheet mode switch may comprise a manual switch which may be operated by the operator as needed.

The present invention is equally applicable to an ADF of the type which feeds a number of originals one by one or an ADF of the type which feeds and exposes the original at the same time.

In the embodiment described above, the original size sensing mechanism is incorporated on the feed path of the original. However, the present invention is not limited to this. The original size sensing mechanism may be incorporated on the original surface.

The present invention is similarly applicable to a copying apparatus of the type wherein the operator sets the original at the exposure surface.

What I claim is:

1. A copying apparatus comprising:
   means for sensing a size of an original to be copied so as to output an original size information;
   first controlling means for controlling a copying operation; and
   second controlling means for controlling said first controlling means so as to perform copying operation control in accordance with said original size information by said sensing means as needed.

2. An apparatus according to claim 1, further comprising a plurality of stacking units for stacking a recording medium, one of said plurality of stacking units being selected by said first controlling means and supplying said recording medium.

3. An apparatus according to claim 1, further comprising means for feeding said original to an exposure position, wherein said second controlling means controls said first controlling means to perform the copying operation control in accordance with said original size information when said feeding means is in a predetermined status.

4. A copying apparatus comprising:
   means for sensing a size of an original so as to output an original size information;
   means for controlling a copying operation in accordance with said original size information by said sensing means; and
   means for releasing the operation of said controlling means in accordance with said original size information.

5. An apparatus according to claim 4, wherein said controlling means prohibits said copying operation when the copying operation in accordance with said original size information is impossible to perform.

6. An apparatus according to claim 5, wherein said controlling means prohibits a feeding operation of a recording medium if the size of the original does not coincide with a size of the recording medium set in said apparatus.

7. An apparatus according to claim 4, wherein said releasing means releases the operation of said controlling means upon reception of a new copying command.

8. A copying apparatus comprising:
   means for feeding an original to be copied to an exposure position;
   means for sensing the original feed by said feeding means;
   means for discriminating a size of the original in accordance with a sensing output from said sensing means and a pulse signal synchronous with an operation of said apparatus; and means for controlling a copying operation in accordance with an output from said discriminating means.

9. An apparatus according to claim 8, wherein said pulse signal is synchronous with a rotating frequency of a drive motor for driving said apparatus.

10. An apparatus according to claim 8, wherein said discriminating means discriminates the size of the original in accordance with a count value of the pulse signals input during an interval in which said sensing means senses the original.

11. An apparatus according to claim 8, wherein said sensing means is incorporated in a feed path of said original.

12. A copying apparatus comprising:

means for feeding an original to be copied to an exposure position;

means for sensing a size of the original so as to output an original size information;

means for outputting a recording meduim size information of a recording medium set in said apparatus; and controlling means for discriminating if said original size information by said sensing means coincides with said recording medium size information, and for establishing a prohibit status of a copying operation and for holding said original at said exposure position if said original size information does not coincide with said recording medium size information.

13. An apparatus according to claim 12, wherein an image of said original held at said exposure position is reproduced on said recording medium upon reception of a new copying command in said prohibit status.

14. An apparatus according to claim 12, wherein said prohibit status is released by releasing the operation of said feeding means.

* * * * *

UNITED STATES PATENT AND TRADEMARK OFFICE
CERTIFICATE OF CORRECTION

PATENT NO. : 4,440,487
DATED : April 3, 1984
INVENTOR(S) : MAKOTO MIURA

It is certified that error appears in the above-identified patent and that said Letters Patent is hereby corrected as shown below:

Column 1, line 57, "forgotton" should read --forgotten--.

Column 2, line 1, "as" should read --an--.

Column 3, line 29, "are" (first occurrence), should read --as--.

Column 5, line 28, "$X_A$" should read --$x_a$--;
　　　　　　line 35, ">" should read --<--;
　　　　　　line 37, ">" should read --<--.

Column 7, line 27, "processing" should read --process--.

Column 8, line 31, delete "since".

Column 11, line 3, "flasing" should read --flashing--.

Signed and Sealed this

Twenty-sixth Day of February 1985

[SEAL]

Attest:

DONALD J. QUIGG

Attesting Officer　　Acting Commissioner of Patents and Trademarks